United States Patent [19]
Baker

[11] Patent Number: 5,815,735
[45] Date of Patent: Sep. 29, 1998

[54] PORTABLE COMPUTER WITH REMOVABLE DISPLAY SCREEN USING REMOVABLY MATEABLE CONNECTORS TO FORM THE SOLE SUPPORTING INTERCONNECTION BETWEEN THE COMPUTER BASE PORTION AND DISPLAY SCREEN STRUCTURE

[75] Inventor: Douglas E. Baker, Spring, Tex.

[73] Assignee: Compaq Computer Corporation, Houston, Tex.

[21] Appl. No.: 639,784

[22] Filed: Apr. 29, 1996

[51] Int. Cl.$^6$ .................................................. G06F 13/00
[52] U.S. Cl. ........................... 395/892; 439/31; 439/137; 439/341; 361/681
[58] Field of Search ..................... 359/713; 364/708.1; 345/87, 680; 361/681, 680, 686; 395/281, 509, 892; 439/31, 137, 341

[56] References Cited

U.S. PATENT DOCUMENTS

| | | | |
|---|---|---|---|
| 4,634,235 | 1/1987 | Fujioka | 359/675 |
| 4,749,364 | 6/1988 | Arney et al. | 361/681 |
| 4,859,911 | 8/1989 | Kinnard et al. | 315/169.03 |
| 4,989,961 | 2/1991 | Yoshioka | 359/713 |
| 5,157,585 | 10/1992 | Myers | 361/680 |
| 5,168,429 | 12/1992 | Hosoi | 361/680 |
| 5,193,069 | 3/1993 | Furuya | 361/681 |
| 5,196,993 | 3/1993 | Herron et al. | 361/681 |
| 5,247,285 | 9/1993 | Yokota et al. | 361/680 |
| 5,313,596 | 5/1994 | Swindler et al. | 395/281 |
| 5,347,630 | 9/1994 | Ishizawa et al. | 345/509 |
| 5,379,183 | 1/1995 | Okonsky et al. | 361/681 |
| 5,418,635 | 5/1995 | Mitsui et al. | 349/113 |
| 5,510,806 | 4/1996 | Busch | 345/87 |
| 5,552,959 | 9/1996 | Penniman et al. | 361/686 |

OTHER PUBLICATIONS

Eric Knorr, Laptos of Luxury, PC World, pp. 94–95, Nov. 1988.

*Primary Examiner*—Thomas C. Lee
*Assistant Examiner*—David Ton
*Attorney, Agent, or Firm*—Konnecker & Smith

[57] ABSTRACT

An LCD display unit is provided with enhanced brightness and a widened viewing cone angle and is removably connected to the base portion of a notebook computer via an LVDS connector. The notebook computer is used as a portion of a desktop computing system that further includes a docking station and a specially designed pivot arm type display support structure. To incorporate the notebook computer into the desktop system, the LCD display unit is removed from its associated base portion, and the removed LCD display unit is plugged into a complementary LVDS connector portion on the support structure which is connected via LVDS cabling to an appropriate interface portion linked to the inserted notebook computer base portion in the docking station. In this manner, the brightness and viewing angle enhanced LCD display conveniently takes the place of the usual larger CRT display unit typically utilized in a desktop computing system, thereby reducing both the cost of the system and the overall desk space required therefor.

31 Claims, 3 Drawing Sheets

PORTABLE COMPUTER WITH REMOVABLE DISPLAY SCREEN USING REMOVABLY MATEABLE CONNECTORS TO FORM THE SOLE SUPPORTING INTERCONNECTION BETWEEN THE COMPUTER BASE PORTION AND DISPLAY SCREEN STRUCTURE

BACKGROUND OF THE INVENTION

1. Field of the Invention

The present invention generally relates to electronic apparatus, such as computers, and, in a preferred embodiment thereof, more particularly relates to a notebook computer provided with a removable display screen that may be used in the normal manner with the computer or detached therefrom and utilized as the display structure in a docking station-based computing station separately incorporating the base portion of the notebook computer.

2. Description of Related Art

Because of their small, easily portable size, notebook computers have become increasingly popular in the past few years as "on the road" computing devices that may be conveniently used in hotel rooms, on airline seat trays, or simply on the user's lap. In many instances, a computer user may have both a notebook computer for his travels and a larger desktop system located in his home or office.

Data created on the smaller notebook computer during its user's travels may be transferred to the larger desktop computer when the user returns by, for example, copying the data from the notebook computer on one or more floppy discs, inserting the disc(s) into the desktop computer, and then transferring the floppy disc data to the desktop computer.

Another option in this regard is to insert the notebook computer into an expansion base or "docking station" that acts as an interface between the notebook computer motherboard, and other associated electronic circuitry, and the larger, more comfortable to use desktop system peripheral devices such as a CRT desktop display monitor, a keyboard, and mouse. Of these desktop peripheral devices the largest is typically the CRT monitor which unavoidably occupies a relatively large portion of the desktop work area.

While the docking station economically utilizes the notebook computer motherboard, thereby avoiding the necessity of a user purchasing two computers, two display screens— the LCD display screen used in the notebook computer and the CRT desktop monitor—are still normally needed to provide the typical computer user with the desired road-and-home computing capabilities. In the overall dual system just described, this requirement for using a CRT monitor for the home or office desktop portion of the overall computing task undesirably takes up a substantial desktop space that could be used for other purposes if available.

A viable proposal for the reduction of the desktop work area that must be dedicated to the display monitor has been slow in coming due to the perception that a relatively large CRT unit is required to provide the display brightness and wide viewing cone angle needed, particularly when the CRT display monitor is positioned an appreciable distance away from, and to one side of, the desktop system user. It is accordingly an object of the present invention to provide, for use in conjunction with a portable computer such as a notebook computer, space-saving desktop display monitor apparatus.

SUMMARY OF THE INVENTION

In carrying out principles of the present invention, in accordance with a preferred embodiment thereof, an electronic device, representatively a notebook computer is provided and includes a base portion having first electronic circuitry and a keyboard section; first connector means carried by the base portion and coupled to its first electronic circuitry; a display screen structure; and second connector means carried by the display screen structure and coupled to the second electronic circuitry.

To permit the notebook computer to be conveniently incorporated into a desktop computing system, with the notebook computer's display screen structure replacing the usual desktop CRT monitor and thereby conserving valuable desktop work space, the second connector means are (1) removably mateable with the first connector means to removably attach the display screen structure to the computer base portion, for transport and direct use therewith, and releasably couple the first and second electronic circuitry, and (2) removably mateable with a third connector structure, supported in a spaced apart relationship with the base portion and coupled to the first electronic circuitry, to couple the first and second electronic circuitry and permit the display screen structure to be used in a separated relationship with the computer base portion.

Representatively, the base portion of the notebook computer has a hinge structure thereon, the first connector means are associated with the hinge structure and include an LVDS socket structure, the second connector means include an LVDS connector plug structure removably insertable into the socket structure, and the display screen structure is pivotally supported on the base portion by the hinge structure when the first and second connector means are removably mated with one another.

To permit the notebook computer display screen structure to serve, in a desktop computing system, in place of a larger CRT display monitor, the display screen structure is preferably an LCD display screen structure with a per pixel active area-to-total pixel area ratio of at least about eighty percent, and a viewing cone angle of at least about seventy degrees at all axes.

According to another aspect of the invention in a preferred embodiment thereof, the notebook computer is incorporated in a space-saving desktop computing system comprising, in addition to the notebook computer, a docking station structure to which the computer base portion, with the display screen structure removed therefrom, may be docked, the docking station structure having interface circuitry that couples to the first electronic circuitry of the docked base portion.

The desktop computing system additionally comprises a display support structure positionable on a horizontal work surface, such as a desktop, and has third connector means to which the second connector means of the removed display screen structure may be removably mated. Interconnect means are provided for coupling the third connector means to the interface circuitry of the docking station structure. Accordingly, the notebook computer display screen structure may be attached directly to the notebook computer base portion for portable use and transport therewith, or used remotely therefrom in the desktop computing system to thereby eliminate the need for a separate display unit, such as a CRT monitor, therein.

The display support structure portion of the desktop computing system, in accordance with another feature of the present invention, is preferably a specially designed pivot arm-type support structure having a main support arm portion adjustably positionable above the horizontal desktop work surface, and upon which the removed notebook computer LCD display screen structure may be rested. An LVDS socket structure is built into the support arm and is removably mateable with the LVDS connector plug structure on the removed notebook display screen structure. LVDS interface cabling and appropriate power wiring connected to the support arm connector socket structure are concealingly extended through the interior of the pivot arm-type display support structure and operatively connected to the docking station interface circuitry.

In accordance with a method of the present invention, the notebook computer may be conveniently incorporated into the desktop computing system by separating the base and enhanced LCD display portions of the notebook computer, operatively connecting the separated computer base portion to the docking station in a manner coupling the first electronic circuitry in the base portion to the docking station circuitry, and inserting the connector plug portion of the separated display screen structure into the associated socket portion in the support arm of the pivot arm-type display support structure. Incorporated into the desktop computing system in this manner, the dual use LCD display structure of the present invention eliminates the need for a separate desktop monitor, thereby substantially reducing the overall desktop area needed for such desktop computing system.

DETAILED DESCRIPTION

Figure 1:
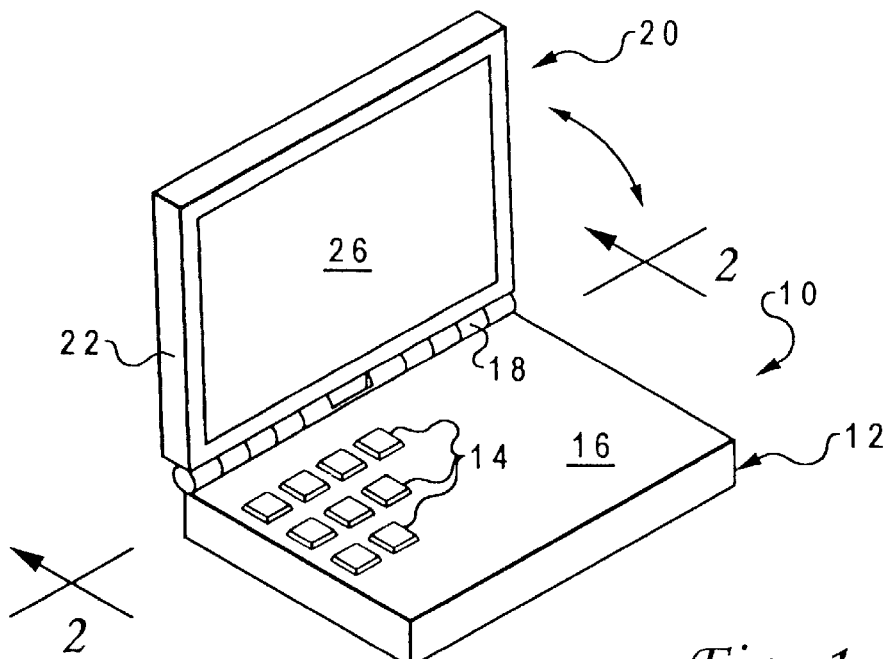
FIG. 1 is a simplified perspective view of a representative notebook computer incorporating therein a specially designed removable LCD display screen incorporating principles of the present invention.
Figure 2:
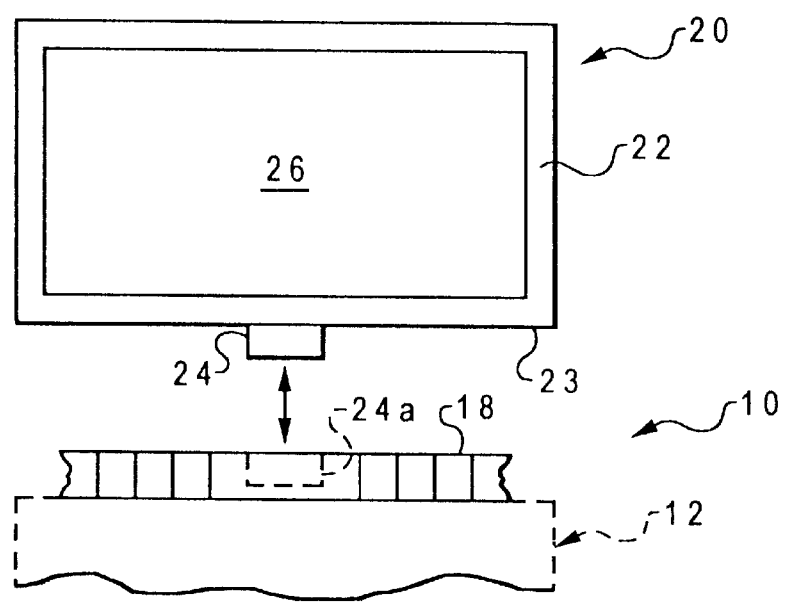
FIG. 2 is an enlarged scale partially exploded side elevational view of a portion of the computer taken generally along line 2—2 of FIG. 1.

Illustrated in simplified form in FIGS. 1 and 2 is an electronic device, representatively a notebook computer 10, that embodies principles of the present invention. Notebook computer 10 includes a rectangular base housing 12 having a keyboard structure with depressible key cap members 14 mounted on the top side 16 of the base housing. A hinge structure 18 extends along a top rear corner portion of the base housing 12 and removably supports a rectangular combination lid/display screen structure 20 on the base housing 12.

As indicated by the double-ended arrow in FIG. 1, the lid/display screen structure 20 is pivotable relative to the base housing 12 between an open use orientation (shown in FIG. 1) in which the structure 20 is generally transverse to the base housing 12 and uncovers the top side 16 thereof, and a closed storage and transport orientation in which the lid/display screen structure 20 is generally parallel to and covers the top base housing side 16. Suitable latch means (not illustrated) are provided for releasably holding the lid/display screen structure 20 in its closed orientation.

Still referring to FIGS. 1 and 2, the lid/display screen structure 20 comprises rectangular frame portion 22 having a bottom side edge portion 23 from which a connector 24 depends, and a rectangular liquid crystal display (LCD) screen structure 26 supported in the frame 22 and operatively coupled to the connector 24. Preferably, the connector 24 is a commercially available low voltage differential signal (LVDS) compatible type. The lid/display screen structure 20 is pivotally and removably held in place on the hinge structure 18 by means of a socket 24a formed therein and operative to removably receive the connector 24 and thereby operatively couple the display screen circuitry to the circuitry in the base housing 12.

Using commercially available LCD display circuitry from, for example, the Sharp Electronics Corporation, 5700 N.W. Pacific Rim Blvd., Camas, Wash. 98607, the screen structure 26 is provided with an increased per pixel active area-to-total pixel area ratio and a widened viewing cone angle. Specifically, the per pixel active area-to-total area ratio of the screen structure 26 is preferably at least about eighty percent, and the viewing cone angle of the screen structure 26 is preferably at least about seventy degrees in all axes. In a manner subsequently described herein, this increase in the brightness and viewing angle of LCD screen structure 26, coupled with other features of the present invention, permits the screen structure 26 to be used as a space-saving replacement for a conventional, substantially larger CRT display monitor in a desktop computing system.

Figure 3:
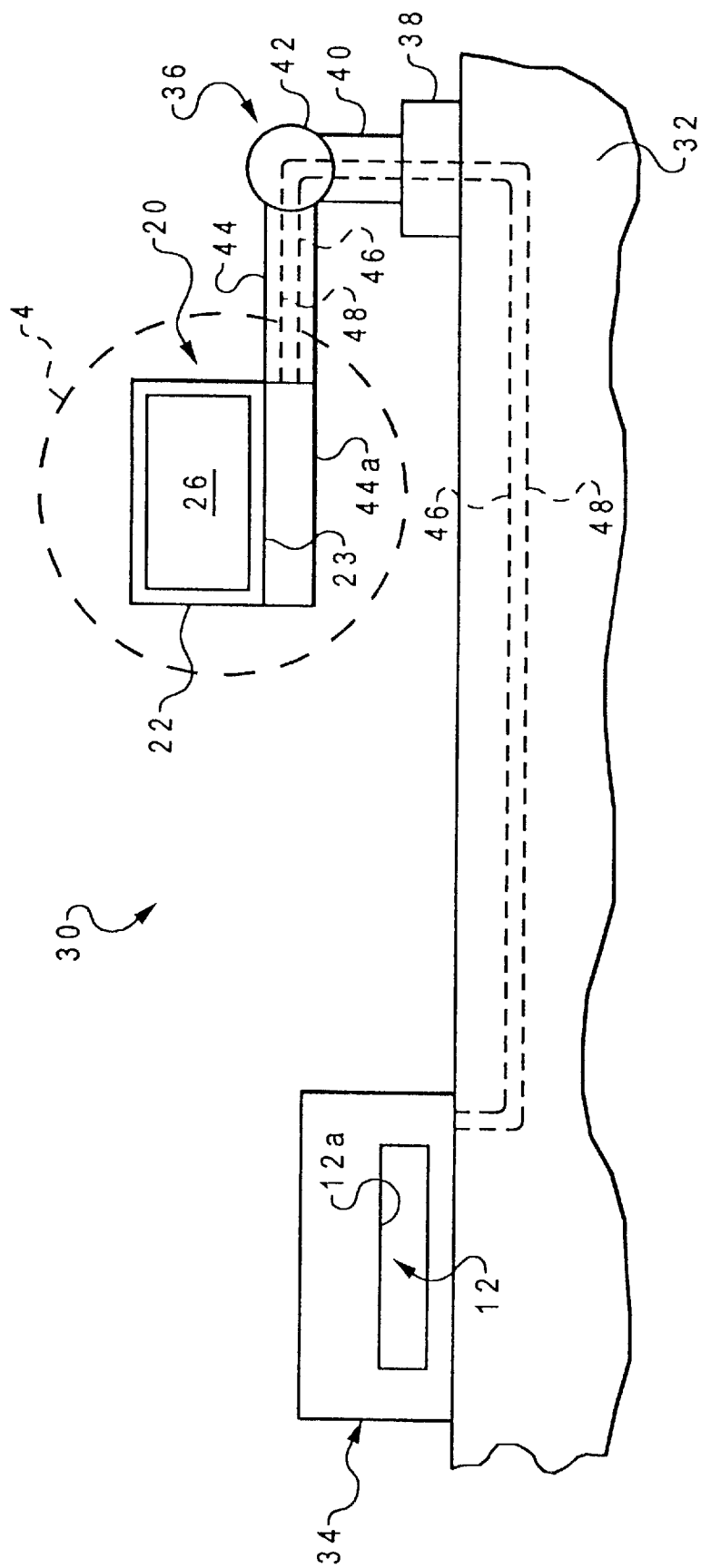
FIG. 3 is a simplified side elevational view of a docking station-based computing system using the LCD display screen, removed from the balance of the notebook computer, to replace a conventional desktop CRT display screen.
Figure 4:
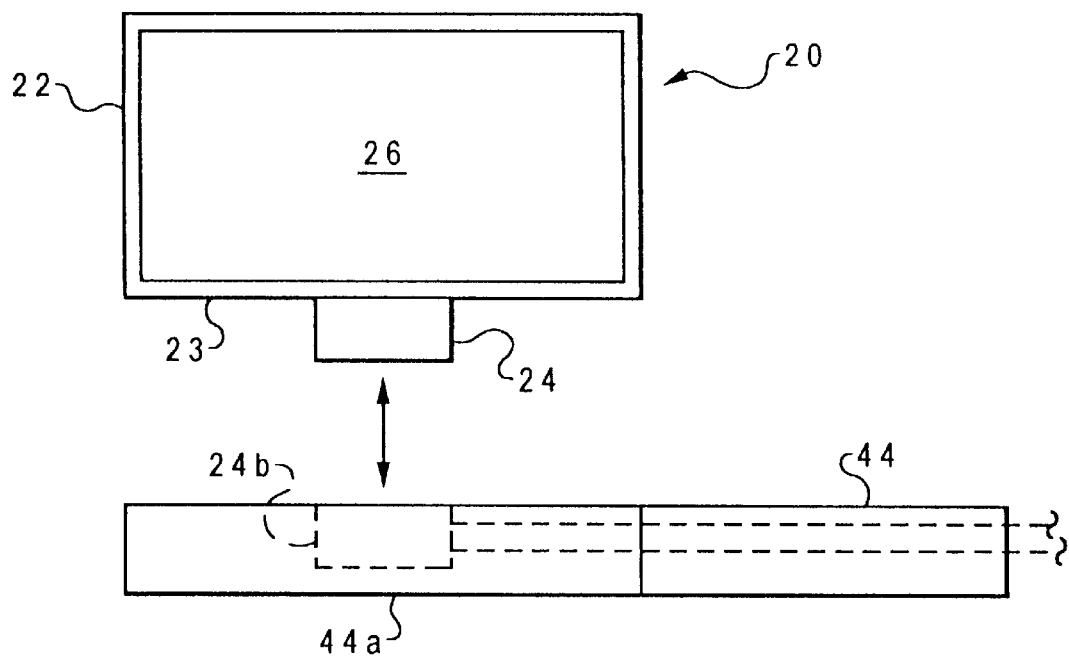
FIG. 4 is an enlargement of the circled area "4" in FIG. 3 and illustrates a portion of a specially designed pivot arm support stand to which the removed LCD display screen is operatively coupled.
Figure 5:
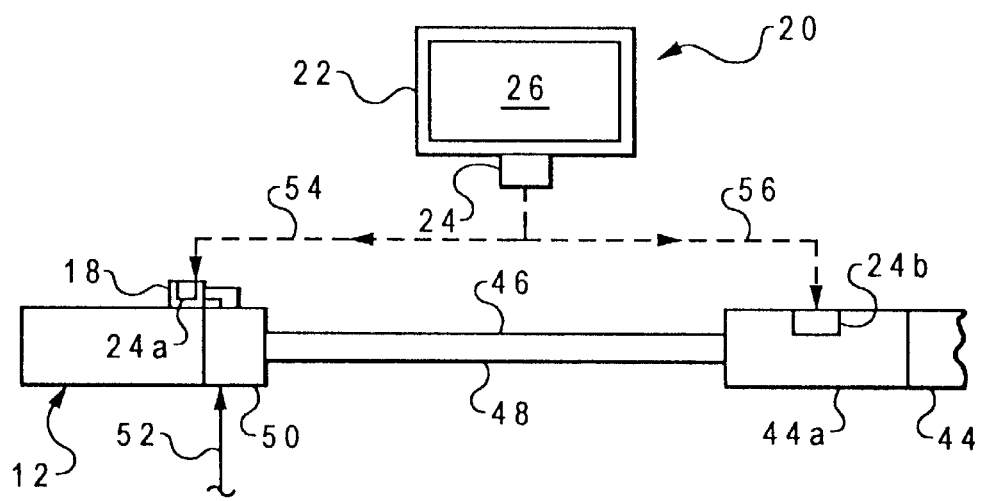
FIG. 5 is a highly simplified circuit diagram of the computing system shown in FIG. 3.

With reference now to FIGS. 3–5, in a manner subsequently described the notebook computer 10 may be conveniently incorporated into a docking station-based desktop computing system 30 (see FIG. 3) disposed on a desk 32 or other suitable support structure. As schematically illustrated, the computing system 30 includes an expansion base or docking station 34 and a specially designed swing arm-type display support stand 36.

The support stand 36 includes a base 38 suitably securable to the desk 32 and having an upstanding post portion 40 with a pivot connection section 42 at its upper end. A horizontal support arm 44 is pivotally secured at its inner end to the connection section 42 and has an outer end portion 44a (see FIG. 4) with a LVDS socket 24b formed in its top side. Socket 24b is configured to removably receive the LVDS connector 24 on the bottom side of the display screen frame 22 with the lid/display screen structure 20 supported atop the outer support arm end portion 44a as shown in FIG. 3. Suitable power wiring 46 and LVDS interface cabling 48 are extended from the socket 24b through the display stand 36 and behind the desk 32, and operatively connected to interface circuitry 50 (see FIG. 5) disposed in the docking station 34 which is supplied with electrical power via line 52.

The docking station 34 (see FIG. 3) has an opening 12a therein into which the notebook computer base housing 12 (with the lid/screen structure 20 removed therefrom) may be inserted to operatively "dock" the inserted computer portion 12 via the interface circuitry 50 to electrically couple the base housing to peripheral desktop devices such as a keyboard and mouse (not shown), and to the support arm socket 24b via the lines 46,48.

As schematically indicated by the dashed, arrowed lines 54,56 in FIG. 5, the lid/display screen structure 20 may be selectively and operatively coupled to the circuitry in the notebook computer base housing 12 by either (1) inserting the LVDS connector 24 into the base housing socket 24a, thereby directly connecting the lid/display screen structure 20 to the base housing circuitry when the base housing 12 is removed from the docking station 34, or (2) inserting the LVDS connector 24 into the support arm socket 24b to thereby indirectly couple the lid/screen structure 20 to the docked base housing portion 12 via the lines 46,48.

To operatively incorporate the lid/display screen structure 20 into the desktop computing system 30, the lid/screen structure 20 is simply removed from the notebook computer base housing 12, the connector portion 24 of the removed lid/screen structure 20 is plugged into the support arm socket 24b, and the notebook computer base housing 12 is operatively inserted into the docking station opening 12a. To return the notebook computer 10 to its normal configuration, the base housing 12 and the lid/screen structure 20 are respectively removed from the docking station 34 and the support arm portion 44a, and the lid/screen structure 20 is plugged back into the notebook computer base housing 12.

Because the lid/screen structure 20 may be utilized directly on the base housing 12 or the support stand 36, the need for a larger CRT monitor in the desktop computing system 30, and the desktop space for such CRT monitor, is advantageously eliminated. Accordingly, the same LCD screen structure 26 uniquely functions as the monitor portion of both the user's portable computing system and his desktop computing system. Due to the previously described enhanced screen brightness and widened viewing angle of the LCD screen structure 26, when the lid/screen structure 22 is operatively positioned on the support arm portion 44a it provides the desktop computing system user with screen visual characteristics of a quality substantially similar to that of the larger CRT monitor which the lid/screen structure 22 advantageously replaces.

The foregoing detailed description is to be clearly understood as being given by way of illustration and example only, the spirit and scope of the present invention being limited solely by the appended claims.

What is claimed is:

1. An electronic device comprising:
    a base portion having first electronic circuitry, a hinge structure carried thereon, and a keyboard section;
    first connector means carried by said hinge structure for pivotal movement therewith relative to said base portion and coupled to said first electronic circuitry;
    a display screen structure having second electronic circuitry; and
    second connector means carried by said display screen structure and coupled to said second electronic circuitry, said second connector means being:
        (1) removably mateable with said first connector means to removably attach said display screen structure to said base portion, for transport and direct use therewith and pivotal movement relative thereto on said hinge structure, and releasably couple said first and second electronic circuitry, the removably mated first and second connector means forming the sole supporting interconnection between said base portion and said display screen structure, and
        (2) removably mateable with a third connector structure, supported in a spaced apart relationship with said base portion and coupled to said first electronic circuitry, to couple said first and second electronic circuitry and permit said display screen structure to be used in a separated relationship with said base portion.

2. The electronic device of claim 1 wherein said electronic device is a portable computer.

3. The electronic device of claim 2 wherein said portable computer is a notebook computer.

4. The electronic device of claim 1 wherein said first and second connector means are LVDS compatible.

5. The electronic device of claim 4 wherein:
    said first connector means include an LVDS connector socket structure, and
    said second connector means include an LVDS connector plug member.

6. The electronic device of claim 1 wherein said display screen structure is an LCD display screen structure.

7. The electronic device of claim 6 wherein said LCD display screen structure has a per pixel active pixel area-to-total pixel area ratio of at least about eighty percent.

8. The electronic device of claim 6 wherein said LCD display screen structure has a viewing cone angle of at least about seventy degrees in all axes.

9. The electronic device of claim 8 wherein said LCD display screen structure has a per pixel active pixel area-to-total pixel area ratio of at least about eighty percent.

10. A portable computer comprising:
    a base housing having first electronic circuitry therein, a keyboard portion, and a hinge portion with an LVDS socket structure disposed therein and coupled to said first electronic circuitry; and
    an LCD display screen structure having second electronic circuitry therein, and an LVDS plug structure removably mateable with said LVDS socket structure to releasably couple said first and second electronic circuitry and operatively support said LCD display screen structure on said hinge portion for pivotal movement relative to said base housing, the removably mated LVDS socket and plug structures forming the sole supporting interconnection between said base housing and said LCD display screen structure, said LCD display screen structure having a per pixel active pixel area-to-total pixel area ratio of at least about eighty percent, and a viewing cone angle of at least about seventy degrees in all axes.

11. The portable computer of claim 10 wherein said portable computer is a notebook computer.

12. A space-saving desktop computing system comprising:
    a portable computer including a base portion having first electronic circuitry and a keyboard section, first connector means carried by said base portion and coupled to said first electronic circuitry, a display screen structure, and second connector means carried by said display screen structure and coupled to said second electronic circuitry, said second connector means being removably mateable with said first connector means to removably attach said display screen structure to said base portion, for transport and direct use therewith, and releasably couple said first and second electronic circuitry;
    a docking station structure to which said base portion, with said display screen structure removed therefrom, may be docked, said docking station structure having interface circuitry that couples to the first electronic circuitry of the docked base portion;
    a display support structure positionable on a horizontal work surface, such as a desktop, and having third connector means to which the second connector means of the removed display screen structure may be removably mated; and
    interconnect means for directly coupling said third connector means to said interface circuitry of said docking station structure, whereby said display screen structure may be attached directly to said base portion for portable use and transport therewith or used remotely therefrom in said desktop computing system to thereby eliminate the need for a separate display unit therein.

13. The space-saving desktop computing system of claim 12 wherein said portable computer is a notebook computer.

14. The space-saving desktop computing system of claim 12 wherein said first, second and third connector means are LVDS compatible.

15. The space-saving desktop computing system of claim 14 wherein:

said first connector means include an LVDS connector socket structure, said second connector means include an LVDS connector plug member, said third connector means include an LVDS connector socket structure, and said interconnect means include LVDS cabling operatively interconnecting said third connector means and said interface circuitry of said docking station structure.

16. The space-saving desktop computing system of claim 12 wherein:

said base portion has a hinge structure thereon, said first connector means are incorporated in said hinge structure for pivotal movement with said hinge structure relative to said base portion, and said display screen structure is pivotally supported on said base portion by said hinge structure when said first and second connector means are removably mated with one another.

17. The space-saving desktop computing system of claim 12 wherein said display screen structure is an LCD display screen structure.

18. The space-saving desktop computing system of claim 17 wherein said LCD display screen structure has a per pixel active pixel area-to-total pixel area ratio of at least about eighty percent.

19. The space-saving desktop computing system of claim 17 wherein said LCD display screen structure has a viewing cone angle of at least about seventy degrees in all axes.

20. The space-saving desktop computing system of claim 19 wherein said LCD display screen structure has a per pixel active pixel area-to-total pixel area ratio of at least about eighty percent.

21. The space-saving desktop computing system of claim 19 wherein:

said display support structure is a pivot arm-type support structure having a main support arm portion adjustably positionable over the work surface and adapted to removably support said display screen structure, and said third connector means are carried by said main support arm structure.

22. The space-saving desktop computing system of claim 21 wherein said interconnect means include cable means operatively connected at one end thereof to said third connector means, extending through said display support structure, and connected at the other end thereof to said interface circuitry.

23. The space-saving desktop computing system of claim 22 wherein said cable means include a length of LVDS interface cable.

24. A method of selectively incorporating a portable computer into a desktop computing system, said method comprising the steps of:

providing a portable computer having a base portion with a first electrical connector structure thereon, and a display screen structure removably attached to said base portion and having a second electrical connector structure releasably mated to said first electrical connector structure;

providing a docking station structure having interface circuitry;

providing a display support structure having a third electrical connector structure thereon;

operatively coupling said third electrical connector structure directly to said interface circuitry;

separating said computer base portion from said computer display screen structure;

placing the separated computer base portion in a docked relationship with said docking station;

placing the separated computer display screen structure on said display support structure; and releasably coupling said second and third electrical connector structures.

25. The method of claim 24 wherein said step of providing a portable computer is performed by providing a notebook computer.

26. The method of claim 24 wherein said step of providing a portable computer is performed by providing a portable computer in which said display screen structure is an LCD display screen structure.

27. The method of claim 26 further comprising the step of providing said LCD display screen structure with a per pixel active pixel area-to-total pixel area ratio of at least about eighty percent, and a viewing cone angle of at least about seventy degrees at all axes.

28. The method of claim 24 further comprising the step of providing said first, second and third electrical connector structures with LVDS compatibility.

29. The method of claim 24 wherein:

said step of providing a display support structure is performed by providing a pivot arm-type support structure having a main adjustable support arm with said third electrical connector structure carried thereon, and said step of placing the separated computer display screen structure on said display support structure is performed by placing the separated computer display screen structure on said main adjustable support arm.

30. The method of claim 29 wherein said operatively coupling step is performed using LVDS interface cable.

31. The method of claim 30 wherein said operatively coupling step includes the step of extending said LVDS interface cable interiorly through said main adjustable support arm.

* * * * *